Dec. 1, 1964    L. L. GAUBIS ETAL    3,159,221
CLAMP RING
Filed April 29, 1963
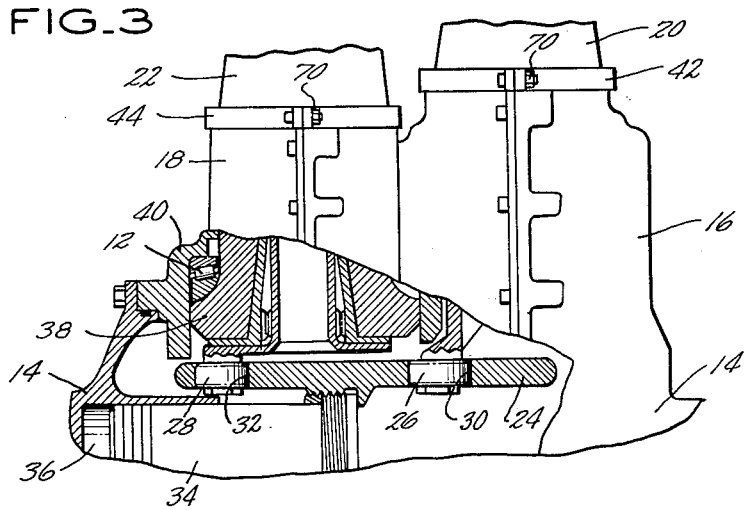
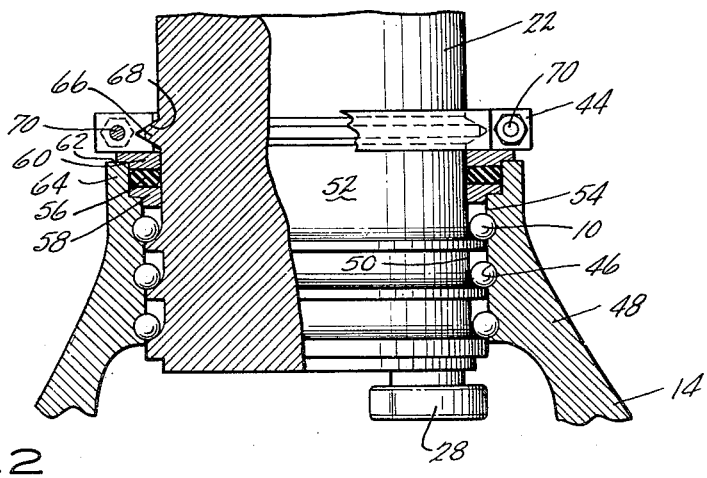
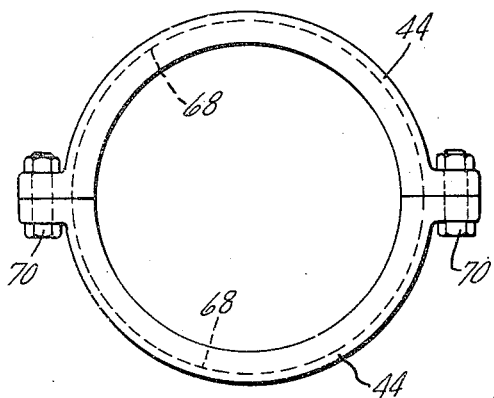
INVENTORS
LEONARD L. GAUBIS
FREDERICK A. YOUNG
BY Harris G. Luther
ATTORNEY 3,159,221
CLAMP RING
Leonard L. Gaubis, Granby, and Frederick A. Young, Simsbury, Conn., assignors to United Aircraft Corporation, East Hartford, Conn., a corporation of Delaware
Filed Apr. 29, 1963, Ser. No. 276,489
8 Claims. (Cl. 170—160.58)

This invention relates to propellers and particularly to propeller blade mounting for controllable pitch propellers.

Adjustable pitch propellers and particularly propellers having blades adjustable or controllable in flight to change the pitch of the propeller are usually provided with an anti-friction bearing between the blade and its supporting hub to retain and position the blade in the hub against the action of centrifugal force and reduce the friction between the blade and hub so as to permit pitch changing movements with the available mechanical, electrical or hydraulic forces in the pitch changing mechanism.

In some constructions while the anti-friction bearings provide adequate support against outward movement they do not provide support against inward movement so that additional support means must be provided to hold the blades in position while the propeller is at rest.

It is an object of this invention to provide an improved construction for supporting a propeller blade against inward movement in the hub.

A further object is a simple, inexpensive blade retaining means which may be applied external to the hub and blade after the blades, bearing and hub have been assembled.

Further and additional objects and advantages will be apparent from the following specification and the attached drawings which shows the now preferred embodiment and in which:

FIG. 1 is a fragmentary view partly in section of a blade mounting means incorporating the invention;

FIG. 2 is an end view of the blade retaining ring; and

FIG. 3 is a side elevation, partially in section and partially schematic showing a modified anti-friction bearing and including the pitch changing mechanism.

It has been customary to provide aeronautical propellers with blade retaining bearings generally utilizing multiple rows of ball bearings 10 as shown in FIG. 1 with a one piece hub or utilizing a single row of roller bearings in a split hub as shown in FIG. 3. In the structure shown in FIG. 3 it has been customary to provide a projection or support on the inside of the hub against which the base of the blade would be seated when the two halves of the hub were assembled and bolted together. In certain constructions such as that shown in FIG. 3 in which two rows of axially spaced blades are assembled in a single hub and in which the pitch changing mechanism is arranged inside of the hub and occupies substantially all the available space therein such a supporting shelf or projection cannot be provided. As shown in FIG. 3 the hub 14 comprises two rows of split blade retaining arms 16 and 18 in which blades 20 and 22 are mounted. Although only one blade and one arm in each row is shown the row may contain as many individual arms and blades as desired. Inside of the hub 18 and projecting under the blades and their supporting arms is a pitch changing cylinder 24 mounted for fore and aft reciprocating movement in the hub and held against rotation with respect to the hub by any suitable means such as splines (not shown) connecting the cylinder 24 and the hub 14. Pins 26 and 28 secured to and depending from the blades 20 and 22 are received in cam slots 30 and 32 in the pitch changing sleeve 24 so that reciprocating movement of the sleeve 24 will rotate the blades 20 and 22 on their axes as defined by the bearings 12 and effect a change in the propeller pitch. Any suitable well-known means such as a piston 34 secured to the sleeve 24 and actuated by the introduction of hydraulic fluid into the space 36 may be utilized for moving the sleeve 24. Hydraulically actuated pistons for changing propeller pitch are well known and as they do not form a part of this invention it is believed that further explanation or showing is unnecessary.

It will be noted that while the bearings 12 acting between the outturned or outwardly extending flange 38 on the base of the propeller blade and the inturned or inwardly extending flange 40 on the split hub arm will act to prevent outward or outboard movement of the blades 20 and 22. The blade, as far as this bearing is concerned, is free to move inward or inboard toward the pitch changing sleeve 24. In order to prevent this inward movement applicants have provided the clamp rings 42 and 44 which act as removable flanges secured to the blades 20 and 22 and cooperating with the outward or outboard ends of the arms 16 and 18 to hold the blades in position and prevent inward movement thereof.

These rings are shown in more detail in FIGS. 1 and 2. In FIG. 1, which shows only a single blade and its support, a multiple row of ball bearings are utilized in place of the single roller bearing of FIG. 3. Reference may be made to Anderson Patent 2,533,415 issued December 12, 1950, for a more complete disclosure of this general type of support. Grooves 46 with the resulting inwardly extending flanges are provided in the arm 48 of the one piece hub 14. Similar somewhat elongated grooves with the resulting outwardly extending flanges are formed in the blade shank 52. The blade shank 52 with the grooves 50 is inserted into the bore or socket 54 in the hub arm 48 and the balls 10 are inserted into the grooves 46 and 50 in any suitable manner such as by loading holes (not shown) in the hub 48. The blade may then be forced outwardly so as to seat the balls 10 in the grooves 46 and 50. The grooves 46 and 50 and their flanges and the balls 10 will locate the blade in an outward or outboard position but other means are required to prevent the blade from inward or inboard movement. Packing material 56, to prevent oil leakage from the inside of the barrel, may be placed between washers 58 and 60. Washer 60 has an extension or outer rim 62 which rests on the outboard end or surface 64 of the hub arm 48. The blade shank is provided with an integral, upstanding or outwardly extending ridge or flange 66 encircling the blade and having inclined sides 68. The clamp ring 44 which may be a split ring formed of two semi-circular parts bolted together by bolts 70, is provided with an internal V groove fitting the inclined sides 68 of the ridge 66.

After the blade 22 has been moved outward or outboard with the bearings in place and the bearings seated, the clamp ring may be placed around the blade shank and over the ridge 66 and tightened by means of the bolts 70. Tightening of the clamp ring will positively position the clamp ring on the blade shank forcing the clamp ring 44 against the washer 60 and the ledge 62 against the outer end of the hub arm socket 64 and the blade outwardly and act as bearing means to hold the blade against inward movement. Washers 60 having different thicknesses of the ledge 62 may be used for adjusting the fit between the clamp ring and the end of the hub barrel or clamp rings of different thicknesses may be used.

The ridge or projection 66 may be secured to the blade shank 22 in any suitable manner but is preferably made integral therewith.

From the above description it will be apparent that we have provided a simple, inexpensive, and efficient stop and positioning means which will positively locate the propeller blade in its outermost position with the anti-friction thrust bearings seated and will hold the blade against inward movement while the propeller is at rest. This device may be attached outside of the blade and of the hub and will not interfere with any pitch changing mechanism or other devices that may be located inside of the hub.

It is to be understood that the invention is not limited to the specific embodiment herein illustrated and described, but may be used in other ways without departing from its spirit and that various changes can be made which would come within the scope of the invention which is limited only by the appended claims.

We claim:

1. In combination, a propeller blade having a shank portion, an integral flange on said shank portion for supporting a thrust bearing, a projecting ridge having an inclined side on said shank portion outboard of said flange, a removable ring having an internal groove having an inclined side mating with the inclined side of said ridge and means for securing said ring to said shank over said ridge.

2. In combination, a hub having a blade socket, a blade rotatably supported in said socket, a thrust bearing in said socket between said blade and hub for holding said blade against outward movement in said socket, said blade movable inwardly in said socket with respect to said bearing after assembly with said hub, means secured to said blade outboard of said socket after assembly of said blade in said socket and coacting with an outer surface of said hub preventing inboard movement of said blade.

3. In an adjustable pitch propeller having a hub, blades rotatably mounted for pitch changing movement in said hub, pitch changing mechanism in said hub, inboard of, and connected with, the bases of said blades, a ridge on the shank of each blade outboard of said hub and clamping means secured to said ridge and coacting with said hub to prevent inboard movement of said blades in said hub.

4. In a controllable pitch propeller having a hub with a blade-receiving socket, a blade in said socket, said socket terminating in an outboard plane surface, means for fixing said blades against radial movement in said hub including means fixed with respect to said hub and coacting with said blade for retaining said blade against outward movement in said socket but ineffective against inward movement and removable means fixed with respect to said blade outboard of said socket coating with said plane surface to force said blades outwardly against said means fixed with respect to said hub upon application of said removable means to said blade.

5. An adjustable variable pitch propeller comprising a rotary driving member having blade shank receiving sockets formed therein, a blade rotatably mounted in each socket, cooperating means on said blade shank and said member for limiting outward movement of each blade in the socket in which it is rotatably mounted, an outstanding ridge on each blade shank outboard of its respective socket, a removable clamp ring straddling said ridge, means clamping said ring to the blade shank and over said ridge in position to coact with the outboard end of its respective socket, said ridge and ring having coacting inclined surfaces forcing said blade outwardly and holding said blade against inboard movement and holding said blade in its limited outboard position.

6. A propeller comprising a hub having a socket with an inwardly extending integral flange in said socket, a propeller blade in said socket and having an outwardly extending integral flange inboard of said socket flange, bearing means between said flanges preventing outboard movement of said blade in said socket, said blade having a second outwardly extending flange outboard of said socket and bearing means between said second flange and said hub preventing inboard movement of said blade in said socket.

7. In combination, a propeller hub having a blade receiving socket, a thrust fixed bearing in said socket, bearing retaining means in said socket locating said bearing in said socket and preventing outward movement of said bearing, a blade in said socket having an outturned flange inboard of said bearing, a removable flange member, secured to said blade outboard of said bearing and retaining means, and including means clamping said bearing and retaining means between said flanges.

8. In combination a propeller blade having an outturned inner flange portion, a thrust bearing on said blade outboard of said flange portion, a removable flange portion adapted to be secured to said blade in a preselected position outboard of said bearing, a hub having a socket receiving said blade and thrust bearing, and, upon assembly of said blade and hub, having a part located between said preselected position of said removable flange portion and said bearing and including a portion fixed with respect to said hub and coacting with said bearing, said removable flange portion including means squeezing said hub part between said flanges and said bearing incident to securing said removable flange portion in said preselected position on said blade to prevent movement of said blade in said hub longitudinally of said blade.

References Cited by the Examiner
UNITED STATES PATENTS 2,080,540  5/37  Isaac _____ 170—160.58 X
2,482,217  9/49  Sacchini _____ 170—160.62 X

OTHER REFERENCES

Lambert, abstract of application, Serial No. 36,050 published December 12, 1950, 641 O.G. 680.

JULIUS E. WEST, *Primary Examiner.*